United States Patent Office 2,756,256
Patented July 24, 1956

2,756,256
PHENYL DIHYDROXYBENZOIC ACIDS

Floyd L. Beman, Midland, Mich., assignor to The Dow Chemical Company, Midland, Mich., a corporation of Delaware No Drawing. Application July 9, 1953,
Serial No. 367,102

4 Claims. (Cl. 260—521)

The present invention is concerned with phenyl substituted dihydroxybenzoic acids in which one hydroxyl is ortho to the carboxyl group, and the other hydroxyl is meta to the carboxyl group and is para to the first hydroxyl when the phenyl group is meta to said first hydroxyl. The compounds contemplated by the present invention may be represented by the following formula and are 3-phenyl-2,5-dihydroxybenzoic acid, 4-phenyl-2,5-dihydroxybenzoic acid, 5-phenyl-2,3-dihydroxybenzoic acid and 6-phenyl-2,5-dihydroxybenzoic acid.

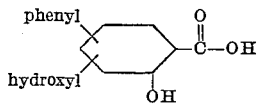

These new compounds are crystalline solids which are somewhat soluble in many organic solvents and water. The compounds exert a strong parasiticidal action against fungi and bacteria and are adapted to be employed as preservatives for paper, wood, paint and textile products. Representative members of the compounds have been found to be of particular value as active toxic constituents of germicidal and disinfectant compositions for the control of *Salmonella typhosa* and *Staphylococcus aureus*. The use of the novel compounds as intermediates for the preparation of certain more complex derivatives is disclosed in my copending application Serial No. 367,087, filed concurrently herewith, now Patent 2,716,663.

The new compounds may be prepared by hydrolyzing a halogenated phenyl-2-hydroxybenzoic acid of the formula

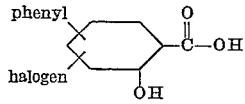

wherein the halogen substituent occupies one of the positions meta to the carboxyl group, the position of said halogen substituent being also para to the hydroxyl group when the phenyl substituent is meta thereto. The hydrolysis of the benzoic acid compound is carried out in an aqueous alkaline medium and preferably in an aqueous solution of an alkali metal hydroxide such as an aqueous sodium hydroxide. Good results are obtained when employing an excess of water and at least two molecular proportions of the alkali metal hydroxide for each molecular proportion of the benzoic acid compound. The reaction may be carried out at atmospheric or higher pressures and takes place smoothly at temperatures of from about 50° to 180° C. In conducting the hydrolysis it is oftentimes convenient to operate at the boiling temperature of the reaction mixture and under reflux.

Upon completion of the hydrolysis the reaction mixture is acidified with a mineral acid such as hydrochloric acid, the desired phenyl dihydroxybenzoic acid product precipitating as a crystalline mass. The latter may be separated by filtration and purified by successive recrystallization from (1) an organic solvent such as ethylene dichloride or ortho-dichlorobenzene, and (2) from water.

The following examples illustrate the invention but are not to be construed as limiting:

*Example 1.—3-phenyl-2,5-dihydroxybenzoic acid*

1173 grams (4 moles) of 5-bromo-3-phenyl-2-hydroxybenzoic acid, 1472 grams of aqueous 50 per cent sodium hydroxide (equivalent to 18.4 moles of NaOH), 84.8 grams of sodium carbonate and 8 grams of sodium acid sulfite were mixed together and sufficient water added thereto to bring the volume up to 8 liters. The resulting mixture was then heated under autogenous pressure for about 3.5 hours and at a temperature of from about 150° to 156.5° C. Following the heating, the mixture was cooled to room temperature and acidified with concentrated hydrochloric acid. During the acidification, a 3-phenyl-2,5-dihydroxybenzoic acid product precipitated as a crystalline solid and was separated from the reaction mixture by filtration and dried. The latter product was then successively recrystallized from ethylene dichloride and from water, the solvent solution in both recrystallization operations being filtered while hot. As a result of these operations, there was obtained a 3-phenyl-2,5-dihydroxybenzoic acid product as a crystalline solid melting at from 183.5° to 184° C.

*Example 2.—4-phenyl-2,5-dihydroxybenzoic acid*

73.3 grams (0.25 mole) of 5-romo-4-phenyl-2-hydroxybenzoic acid, 92 grams of aqueous 50 per cent sodium hydroxide (equivalent to 1.15 mole of NaAH, 53 grams of sodium carbonate and 0.5 gram of sodium acid sulfite were dispersed in sufficient water to produce 0.5 liter of ultimate mixture. This mixture was heated at the boiling temperature and under reflux for about 24 hours and thereafter cooled to room temperature and acidified with hydrochloric acid. During the acidification, a 4-phenyl-2,5-dihydroxybenzoic acid product precipitated as a crystalline material and was separated by filtration. The latter product was successively recrystallized from ortho-dichlorobenzene and from water and found to melt at 240° to 242° C.

*Example 3.—5-phenyl-2,3-dihydroxybenzoic acid*

586 grams (2 moles) of 3-bromo-5-phenyl-2-hydroxybenzoic acid, 736 grams of aqueous 50 per cent sodium hydroxide (equivalent to 9.2 moles of NaOH), 43 grams of sodium carbonate and 4 grams of sodium acid sulfite were mixed together and sufficient water added thereto to bring the volume up to 4 liters. The resulting mixture was then heated under autogenous pressure for about two and one-half hours and at a temperature of from about 150° to 156° C. Following the heating the mixture was cooled to room temperature and acidified with concentrated hydrochloric acid. During the acidification, a 5-phenyl-2,3-dihydroxybenzoic acid product precipitated and was separated from the reaction mixture by filtration and dried. The latter product was then successively recrystallized from the chlorobenzene and ethylene dichloride and found to melt at 220° to 221° C.

*Example 4.—6-phenyl-2,5-dihydroxybenzoic acid*

One mole of 5-chloro-6-phenyl-2-hydroxybenzoic acid and 2 moles of sodium hydroxide are dispersed in 2 liters of water and the resulting mixture heated under autogenous pressure for about 4 hours at a temperature of from 150° to 160° C. Following the heating period the mixture is cooled to room temperature and acidified with concentrated hydrochloric acid. During the acidification a 6-phenyl-2,5-dihydroxybenzoic acid product precipitates in the reaction mixture and is separated by filtration.

The halogenated phenyl-2-hydroxybenzoic acids employed as starting materials, as previously described, may be prepared by halogenating a suitable phenyl-2-hydroxybenzoic acid in glacial acetic acid as reaction medium.

The halogenation takes place smoothly at temperatures of from about 40° to 115° C. In carrying out the reaction, bromine, chlorine or iodine chloride is contacted portionwise with the phenyl-2-hydroxybenzoic acid dissolved in acetic acid and under conditions of elevated temperature in the reaction vessel. Upon completion of the reaction, the reaction mixture may be diluted with water to precipitate the halogenated phenyl-2-hydroxybenzoic acid product as a crystalline solid. The latter may be separated by filtration and purified by recrystallization from suitable organic solvents. The latter compounds and methods for their production are disclosed in a copending application Serial No. 327,455, filed December 22, 1952.

I claim:

1. A phenyl substituted dihydroxybenzoic acid in which one hydroxyl is ortho to the carboxyl group, and the other hydroxyl is meta to the carboxyl group and is para to the first hydroxyl when the phenyl group is meta to said first hydroxyl.
2. 3-phenyl-2,5-dihydroxybenzoic acid.
3. 4-phenyl-2,5-dihydroxybenzoic acid.
4. 5-phenyl-2,3-dihydroxybenzoic acid.

References Cited in the file of this patent

FOREIGN PATENTS

| | | |
|---|---|---|
| 125,890 | Switzerland | May 18, 1927 |
| 272,232 | Great Britain | June 7, 1927 |

OTHER REFERENCES

Beilstein I (4th ed., 1949) Band X, 314.
Beilstein II (4th ed., 1927), Band X, 445.